US009218255B2

(12) United States Patent
Brown et al.

(10) Patent No.: US 9,218,255 B2
(45) Date of Patent: Dec. 22, 2015

(54) MULTI-VOLUME INSTANT VIRTUAL COPY FREEZE

(75) Inventors: Theresa M. Brown, Tucson, AZ (US); Nedlaya Y. Francisco, Tucson, AZ (US); Suguang Li, Tucson, AZ (US); Beth A. Peterson, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 689 days.

(21) Appl. No.: 13/595,453

(22) Filed: Aug. 27, 2012

(65) Prior Publication Data

US 2014/0059309 A1    Feb. 27, 2014

(51) Int. Cl.
*G06F 12/00* (2006.01)
*G06F 11/16* (2006.01)
*G06F 11/20* (2006.01)

(52) U.S. Cl.
CPC ........ *G06F 11/1662* (2013.01); *G06F 11/2094* (2013.01); *G06F 2201/82* (2013.01); *G06F 2201/84* (2013.01)

(58) Field of Classification Search
USPC ........................................................ 711/162
See application file for complete search history.

(56) References Cited

U.S. PATENT DOCUMENTS

| 6,611,901 | B1 | 8/2003 | Micka et al. |
| 7,055,009 | B2 | 5/2006 | Factor et al. |
| 2004/0260898 | A1 | 12/2004 | Stanley et al. |
| 2006/0139697 | A1 | 6/2006 | Fuente |
| 2009/0144345 | A1 | 6/2009 | Werner et al. |
| 2009/0300304 | A1 | 12/2009 | Boyd et al. |
| 2011/0099345 | A1* | 4/2011 | Mitsui ........................... 711/162 |

FOREIGN PATENT DOCUMENTS

| JP | 2006527873 | 12/2006 |
| JP | 2009295168 | 12/2009 |

OTHER PUBLICATIONS

PCT International Search Report & Written Opinion dated Dec. 17, 2013 for Serial No. PCT/IB2013/056803, 8 pp.
US Publication 2004/0260898 is the English counterpart of JP Publication 2006-527873.
US Publication 2009/0300304 is the English counterpart of JP Publication 2009-0295168.
English translation of Japanese reference JP2009295168 dated Dec. 17, 2009, 27 pp.

* cited by examiner

*Primary Examiner* — Jared Rutz
*Assistant Examiner* — Hamdy S Ahmed
(74) *Attorney, Agent, or Firm* — Janaki K. Davda; Konrad Raynes Davda & Victor LLP (57) ABSTRACT

Provided are a computer implemented method, computer program product, and system for creating a consistency group. For each source volume that has an instant virtual copy relationship with a target volume, an indicator for the source volume is set to true in a Fast Incremental with Freeze (FIF) map. The consistency group for each source volume whose indicator is set to true in the FIF map and each associated target volume is created by: performing a quick Instant Virtual Copy (IVC) freeze command to freeze each source volume whose indicator is set to true in the FIF map and performing a consistency group created command to thaw each source volume whose indicator is set to true in the FIF map.

21 Claims, 10 Drawing Sheets

FIG. 1

| Block of Storage 250 | | | |
|---|---|---|---|
| 250a | 250b | ... | 250p |

MULTI-VOLUME INSTANT VIRTUAL COPY FREEZE

FIELD

Embodiments of the invention relate to multi-volume instant virtual copy freeze.

BACKGROUND

Computing systems often include one or more host computers ("hosts") for processing data and running application programs, direct access storage devices (DASDs) for storing data, and a storage controller for controlling the transfer of data between the hosts and the DASD. Storage controllers, also referred to as control units or storage directors, manage access to a storage space comprised of numerous hard disk drives, otherwise referred to as a Direct Access Storage Device (DASD). Hosts may communicate Input/Output (I/O) requests to the storage space through the storage controller.

Some disaster recovery systems address data loss over a period of time, in which case writes to volumes on data storage may be lost. The writes may update data, write new data, or write the same data again. To assist in recovery of data writes, a copy of data may be provided at a remote location. Such copies may also be referred to as dual or shadow copies.

The remote mirroring systems provide techniques for mirroring data in order to facilitate recovery after a system failure. Such data shadowing systems can also provide an additional remote copy for non-recovery purposes, such as local access at a remote site.

In remote mirroring systems, data is maintained in volume pairs. A volume pair is comprised of a volume in a primary storage device and a corresponding volume in a secondary storage device that includes a copy of the data maintained in the primary volume. Typically, the primary volume of the pair will be maintained in a primary direct access storage device (DASD) and the secondary volume of the pair is maintained in a secondary DASD shadowing the data on the primary DASD. A primary storage controller may be provided to control access to the primary DASD and a secondary storage controller may be provided to control access to the secondary DASD.

Volumes in the secondary DASDs are consistent when all writes have been transferred in their logical order, i.e., all dependent writes transferred first before the writes dependent thereon. In the banking example, this means that the deposit is written to the secondary volume before the withdrawal. A consistency group is a collection of related volumes that need to be kept in a consistent state. A consistency transaction set is a collection of updates to the primary volumes such that dependent writes are secured in a consistent manner. Consistency groups maintain data consistency across volumes.

In many systems, data on one storage device, such as a DASD, may be copied to the same or another storage device so that access to data volumes can be provided from two different devices. A point-in-time copy involves physically copying all the data from source volumes to target volumes so that the target volume has a copy of the data as of a point-in-time. A point-in-time copy can also be made by logically making a copy of the data and then only copying data over when necessary, in effect deferring the physical copying. This logical copy operation is performed to minimize the time during which the target and source volumes are inaccessible.

A number of direct access storage device (DASD) subsystems are capable of performing "Instant Virtual Copy" (IVC) operations, also referred to as "fast replicate functions." Instant virtual copy operations work by modifying metadata in structures, such as relationship tables or pointers, to treat a source data object as both the original and copy. In response to a host's copy request, the storage subsystem immediately reports creation of the copy without having made any physical copy of the data. Only a "virtual" copy has been created, and the absence of an additional physical copy is completely unknown to the host.

Later, when the storage system receives updates to the original or copy, the updates are stored separately and cross-referenced to the updated data object only. At this point, the original and copy data objects begin to diverge. The initial benefit is that the IVC occurs almost instantaneously, completing much faster than a normal physical copy operation. This frees the host and storage subsystem to perform other tasks. The host or storage subsystem may even proceed to create an actual, physical copy of the original data object during background processing, or at another time.

One such IVC operation is known as a FlashCopy® operation. A FlashCopy® operation involves establishing a logical point-in-time relationship between source and target volumes on the same or different devices. The FlashCopy® operation guarantees that until a track in a FlashCopy® relationship has been hardened to its location on the target disk, the track resides on the source disk. A relationship table is used to maintain information on all existing FlashCopy® relationships in the subsystem. During the establish phase of a Flash-Copy® relationship, one entry is recorded in the source and target relationship tables for the source and target that participate in the FlashCopy® being established. Each added entry maintains all the required information concerning the Flash-Copy® relationship. Both entries for the relationship are removed from the relationship tables when all FlashCopy® tracks from the source extent have been physically copied to the target extents or when a withdraw IVC command is received. In certain cases, even though all tracks have been copied from the source extent to the target extent, the relationship persists.

The target relationship table further includes a bitmap that identifies which tracks involved in the FlashCopy® relationship have not yet been copied over and are thus protected tracks. Each track in the target device is represented by one bit in the bitmap. The target bit is set (e.g., either logically or physically) when the corresponding track is established as a target track of a FlashCopy® relationship. The target bit is reset when the corresponding track has been copied from the source location and destaged to the target device due to writes on the source or the target device, or a background copy task.

Once the logical relationship is established, hosts may then have immediate access to data on the source and target volumes, and the data may be copied as part of a background operation. A read to a track that is a target in a FlashCopy® relationship and not in cache triggers a stage intercept, which causes the source track corresponding to the requested target track to be staged to the target cache when the source track has not yet been copied over and before access is provided to the track from the target cache. This ensures that the target has the copy from the source that existed at the point-in-time of the FlashCopy® operation. Further, any destages to tracks on the source device that have not been copied over triggers a destage intercept, which causes the tracks on the source device to be copied to the target device.

A consistency group created command acts on a logical subsystem, while an establish FlashCopy® freeze command is used for consistency group creation, and is done on a volume by volume basis. Each establish FlashCopy® freeze command is processed individually, and this creates a delay if there is the desire to create a consistency group with multiple volumes. Consistency groups are formed on a logical subsystem (LSS) basis. In order to form consistency groups, a user first issues an establish FlashCopy® freeze command to the volumes to be in a consistency group, then, the user issues a consistency group created (unfreeze) command for each logical subsystem in the consistency group. Because the unfreeze command is issued after all of the freeze commands have successfully executed, there can be a delay as more and more volumes are within a single consistency group. For example, to put a large number of volumes (e.g., multiple thousands of volumes) into a consistency group may be in the order of several minutes. However, internally, when a freeze command is received, Input/Output (I/O) is held off by putting volumes in a long busy state until the unfreeze command arrives (at which point the volumes are removed from the long busy state) or until a 1-2 minute timer expires. It is possible, then, that if there are too many volumes in a consistency group, the unfreeze command may arrive after some of the volumes' timer expires, and the consistency group is not formed.

Also, internally, a quiesce mechanism is initiated for the freeze. Once the I/O drains, the freeze process begins. The quiesce process requires a Task Control Block (TCB) to wait for the drain to complete. The TCB is allocated in addition to the normal TCB used for the chain itself (the start Input/Output (I/O) TCB).

SUMMARY

Provided are a computer implemented method, computer program product, and system for creating a consistency group. For each source volume that has an instant virtual copy relationship with a target volume, an indicator for the source volume is set to true in a Fast Incremental with Freeze (FIF) map. The consistency group for each source volume whose indicator is set to true in the FIF map and each associated target volume is created by: performing a quick Instant Virtual Copy (IVC) freeze command to freeze each source volume whose indicator is set to true in the FIF map and performing a consistency group created command to thaw each source volume whose indicator is set to true in the FIF map.

BRIEF DESCRIPTION OF THE SEVERAL VIEWS OF THE DRAWINGS

In the drawings, like reference numbers represent corresponding parts throughout.

FIG. 7 is formed by FIGS. 7A and 7B.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
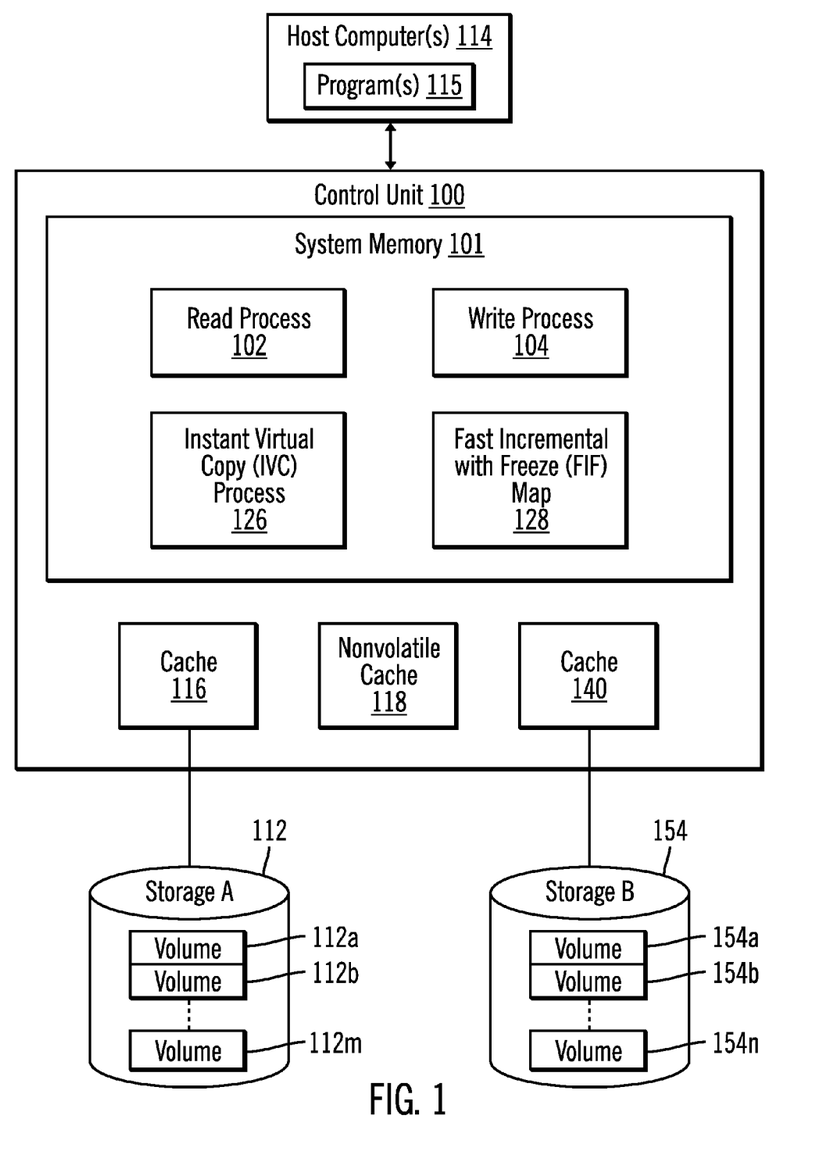
FIG. 1 illustrates, in a block diagram, a computing environment in accordance with certain embodiments of the invention.

FIG. 1 illustrates, in a block diagram, a computing environment in accordance with certain embodiments of the invention. A control unit 100 provides one or more host computers 114 access to storage A 112 and storage B 154. In certain embodiments, storage B 154 maintains back-up copies of all or a subset of the volumes of the storage A 112. The host computers 114 may each execute one or more programs 115 under control of an operating system (not shown) and executing on a Central Processing Unit (CPU) (not shown). The control unit 100 receives Input/Output (I/O) requests from one or more programs 115 at one or more host computers 114 (e.g., over a network) directed toward storage A 112 and/or storage B 154. Storage A 112 is configured to have volumes (e.g., Logical Unit Numbers, Logical Devices, etc.) 112a,b, ... m, where m represents that there may be any number of volumes. Storage B 154 is configured to have volumes (e.g., Logical Unit Numbers, Logical Devices, etc.) 154a,b ... n, where n represents that there may be any number of volumes.

Figure 2:
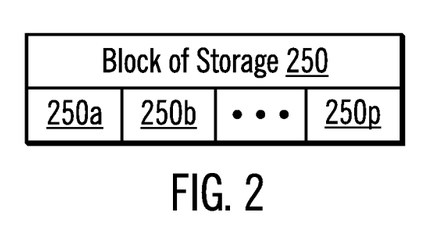
FIG. 2 illustrates blocks of storage in accordance with certain embodiments of the invention.

FIG. 2 illustrates blocks of storage in accordance with certain embodiments of the invention. The storage A 112 and the storage B 154 may each be divided into blocks of storage 250 (FIG. 2) containing blocks of data, and the blocks of storage 250 are further divided into sub-blocks of storage (250a-250p, where p represents that there may be any number of sub-blocks) that contain sub-blocks of data. In certain embodiments, the blocks of data are contents of tracks, while the sub-blocks of data are contents of sectors of tracks. A volume may be any logical or physical element of storage. In certain embodiments, the blocks of data are contents of tracks, while the sub-blocks of data are contents of sectors of tracks.

The control unit 100 includes a cache 116 in which updates to blocks of data in the storage A 112 are maintained until written to storage A 112 (i.e., the blocks of data are destaged). The control unit 100 includes a cache 140 in which updates to blocks of data in the storage B 154 may be maintained until written to storage B 154 (i.e., the blocks of data are destaged). The system memory 101 may be in a separate memory devices from caches 116, 140 or may share a memory device with cache 116 and/or 140.

Additionally, the control unit 100 includes a nonvolatile cache 118. The non-volatile cache 118 may be, for example, a battery-backed up volatile memory, to maintain a non-volatile copy of data updates and other information.

The control unit 100 includes system memory 101 in which a read process 102 for reading data, and a write process 104 for writing data reside. The system memory 101 may also include an IVC process 126 and a Fast Incremental with Freeze (FIF) map 128.

The cache 116 and cache 140 may comprise separate memory devices or different sections of a same memory device. The cache 116 and cache 140 may be used to buffer read and write data being transmitted between the hosts 114, storage A 112, and storage B 154. Further, caches 118 and 140 may be referred to as source and target caches for holding source or target blocks of data in an IVC relationship, and the caches 118 and 140 may store at the same time source and target blocks of data in different IVC relationships.

In certain embodiments, removable storage (instead of or in addition to remote storage, such as storage B 154) may be used to maintain back-up copies of all or a subset of the storage A 112, and the techniques of the invention transfer data to the removable storage rather than to the remote storage. The removable storage may reside at the control unit 100.

In certain embodiments, the control unit 100 may be comprised of any control unit known in the art.

In certain embodiments, the host computers 114 and the control unit 100 may comprise any computing device known in the art, such as a mainframe, server, personal computer, workstation, laptop, handheld computer, telephony device, network appliance, virtualization device, storage controller, etc.

In certain embodiments of the invention, data is maintained in volume pairs. A volume pair is comprised of a first volume in a first storage device (e.g., storage A 112) and a corresponding volume in a second storage device (e.g., storage B 154) that includes a consistent copy of the data maintained in the first volume. For example, volume 112a at storage A 112 may correspond to volume 154a at storage B 154.

For storage 112, 154, the values of m and n may be the same or different. The storage 112, 154 may each comprise an array of storage devices, such as Direct Access Storage Devices (DASDs), Just a Bunch of Disks (JBOD), Redundant Array of Independent Disks (RAID), virtualization device, etc.

For ease of reference, the terms tracks and sectors may be used herein as examples of blocks of data and sub-blocks of data, but use of these terms is not meant to limit the technique of the invention to tracks and sectors. The techniques of the invention are applicable to any type of storage, block of storage or block of data divided in any manner.

For ease of reference, a block of data in source storage may be referred to as a "source block of data," and a block of data in target storage may be referred to as a "target block of data."

When the indication of which storage is to be a source and which storage is to be a target is reversed, for ease of reference, the "original source" may be referred to as a "new target", the "original target" may be referred to as a "new source", an "original source block of data" may be referred to as a "new target block of data," and an "original target block of data" may be referred to as a "new source block of data."

Figure 3:
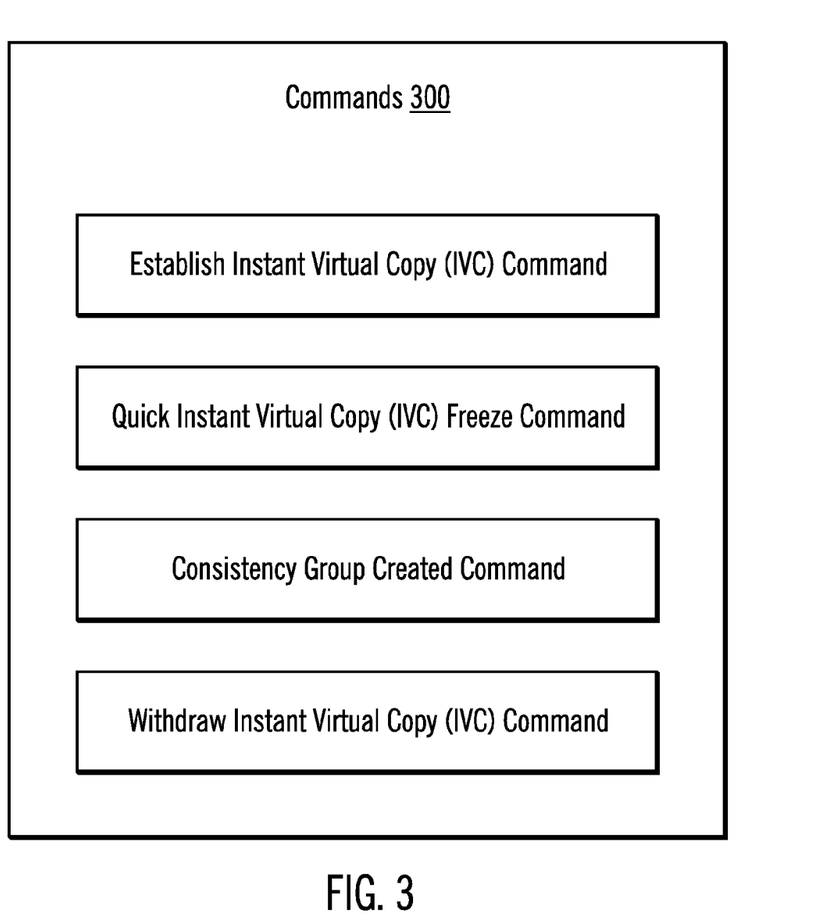
FIG. 3 illustrates commands in accordance with certain embodiments.

FIG. 3 illustrates commands 300 in accordance with certain embodiments. The commands 300 includes an establish IVC command, a quick IVC freeze command, a consistency group created command, and a withdraw IVC command.

The establish IVC command is received with the persistent IVC relationship indicator and a FIF indicator set. This creates a persistent relationship between a source volume and a target volume and adds the source volume to the FIF map.

Embodiments provide the new quick IVC freeze command (e.g., a new quick FlashCopy® freeze command) that performs on a logical subsystem granularity or other granularity, rather than a device granularity. The source volumes in the FIF map for the logical subsystem (or other granularity) form the set of source volumes to freeze and copy (i.e., Flash-Copy® copy). The quick IVC freeze command invokes the establish IVC command to freeze each source volume that has an indicator set to true in the FIF map and the associated target volume (i.e., freezes the pair formed by the source volume and the target volume).

Once the quick IVC freeze command completes, a consistency group has been formed. Then the consistency group created command is run on a logical subsystem basis to complete the work associated with forming a consistency group and allows the source and target volumes to now be thawed.

Also, the source volume remains in the FIF map until a withdraw IVC command is done. The withdraw IVC command removes the source volume from the FIF map.

Thus, the establish IVC command is performed once per source volume that is to be set in the FIF map. Then, the quick IVC freeze command and the consistency group created command are performed as often as desired to form consistency groups.

Embodiments protect the integrity of the data in the consistency group. Certain embodiments reduce freeze time by allowing for up to 256 devices in a command and allow the individual source and target volume freezes to be done out of order (i.e., in any order).

The quick IVC command may act on multiple source volumes to form a consistency group. Thus, embodiments avoid having multiple establish IVC freeze commands that are issued separately against each source volume before a consistency group created command is issued. Embodiments avoid having the processing of each individual establish IVC freeze command along with the handshaking required with the channel being time-consuming.

With embodiments, during the quick IVC freeze command and following the establish completion, the source volume is placed in long busy state and remains in the long busy state until the consistency group created command releases the source volume or the timer expires, at which point the source volume is removed from the long busy state. Once a source volume is in the long busy state, no new I/O can begin, but the I/O in progress is drained (i.e., processed) before the freeze work begins.

Figure 4:
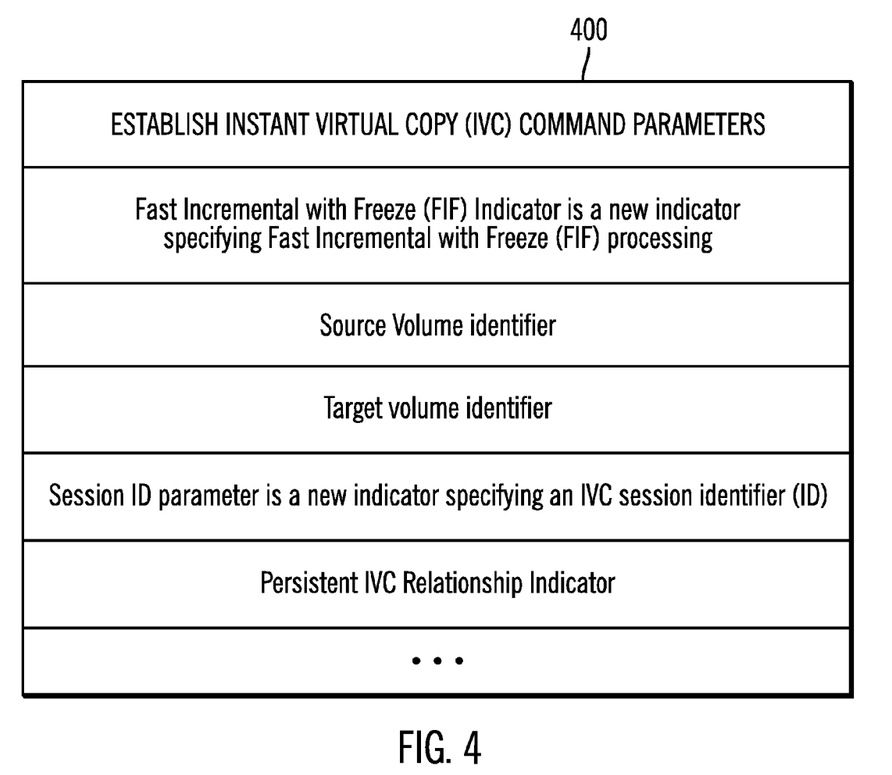
FIG. 4 illustrates new parameters in a table for an establish IVC command in accordance with certain embodiments.

FIG. 4 illustrates new parameters in a table 400 for an establish IVC command in accordance with certain embodiments. The ellipses in table 400 indicate that there may be other parameters, which are not shown. Also, there may be other columns in table 400, which are not shown. One new parameter is a FIF indicator, which specifies FIF processing. In certain embodiments, if the FIF indicator is set to one ("1"), then the IVC process 126 recognizes that this is for FIF processing. Another new parameter is a session identifier (ID) parameter, which is a new indicator for an IVC session identifier (ID). In certain embodiments, the session ID parameter is a numerical value of a session ID that ties various IVC commands together. In particular, each IVC with the same session ID is in a same consistency group. The establish IVC command also specifies a source volume identifier (e.g., an address) and a target volume identifier (e.g., an address). The establish IVC command includes a persistent IVC relationship indicator.

Embodiments refer to various indicators, and each of these indicators may be a flag or a bit in various embodiments.

Figure 5:
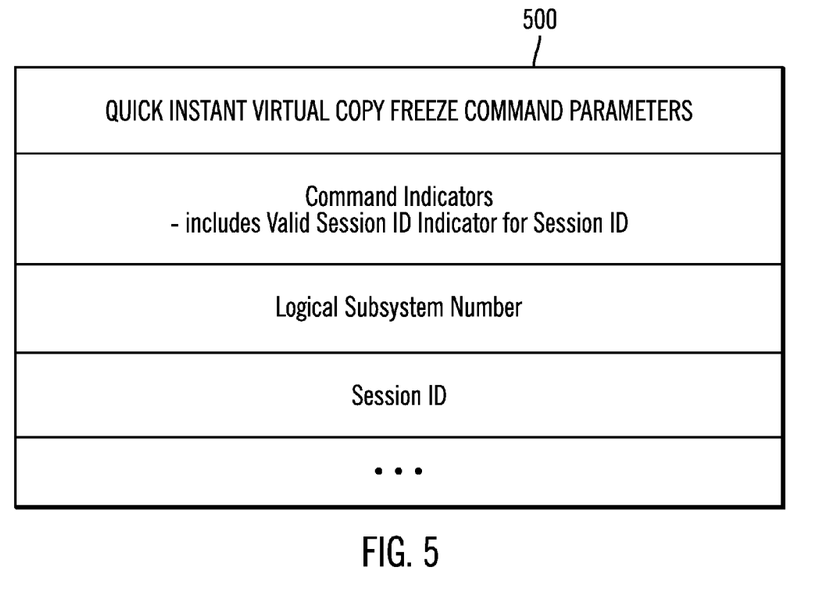
FIG. 5 illustrates parameters in a table for a new quick IVC freeze command in accordance with certain embodiments.

FIG. 5 illustrates parameters in a table 500 for a new quick IVC freeze command in accordance with certain embodiments. The parameters include command indicators that include a valid session ID indicator that indicates whether the session ID is valid, a logical subsystem number, and a session ID. The ellipses in table 500 indicate that there may be other parameters, which are not shown. Also, there may be other columns in table 500, which are not shown.

Figure 6:
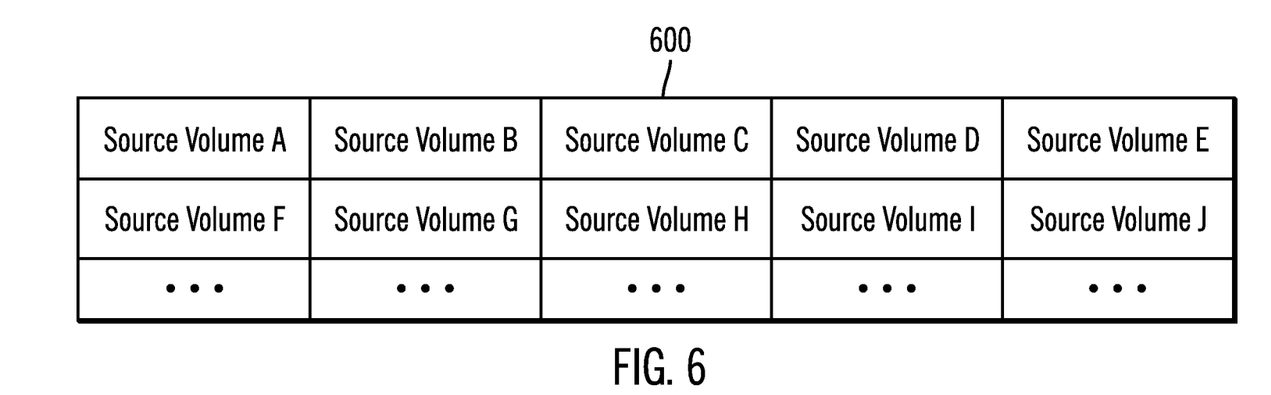
FIG. 6 illustrates a new fast incremental freeze map in accordance with certain embodiments.

FIG. 6 illustrates a new FIF map 600 in accordance with certain embodiments. In certain embodiments, the FIF map 600 is a bitmap. In certain embodiments, the FIF map 600 is created for each logical subsystem, with an indicator for each source volume (i.e., device) within the logical subsystem. In certain embodiments, when the indicator is set to true (e.g., set to one), then that source volume is part of a FIF. Various embodiments may use a granularity other than logical subsystem. For example, the FIF map 600 may be created for a Central Electronics Complex (CEC), a node, a box boundary, etc.

Figure 7A:
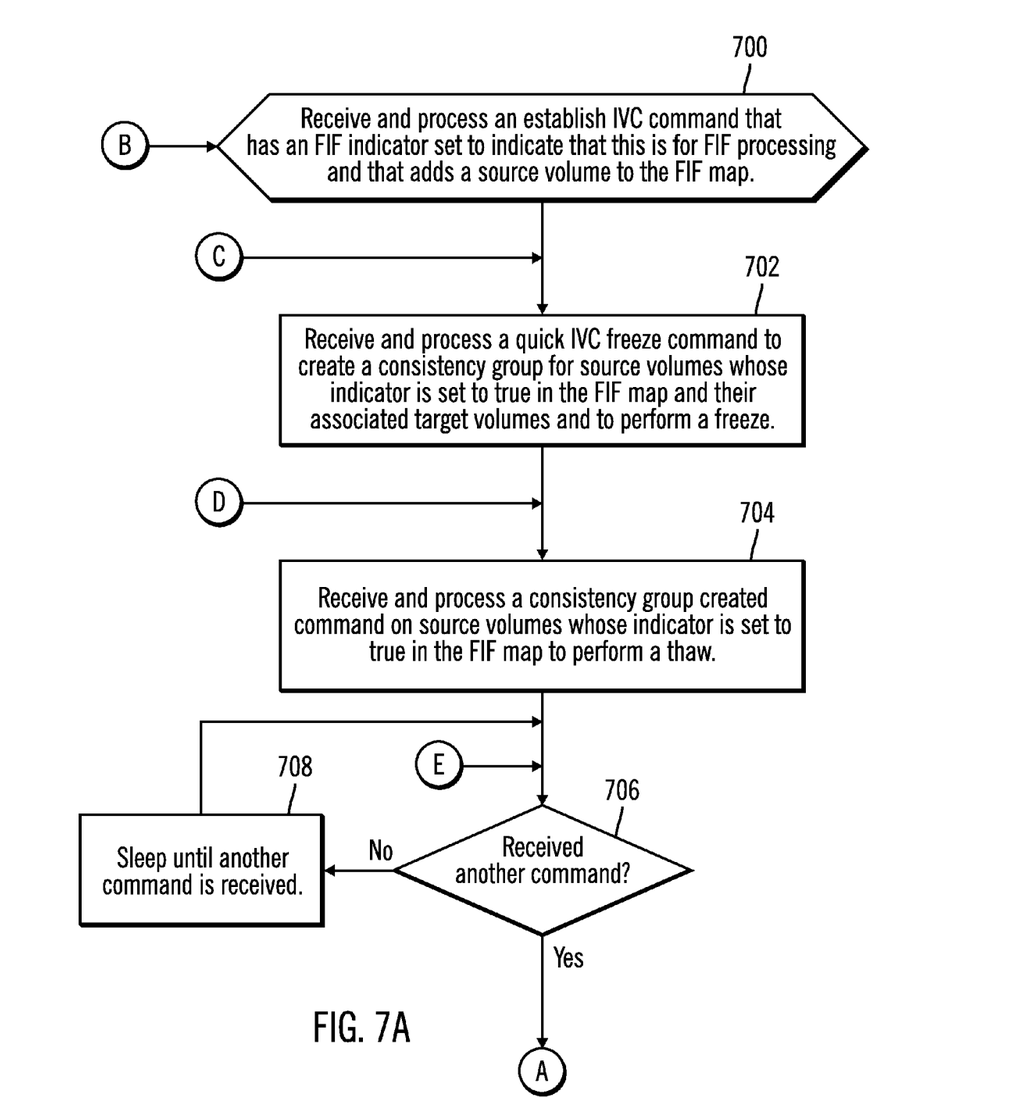
FIG. 7 illustrates, in a flow diagram, operations in accordance with certain embodiments.
Figure 7B:
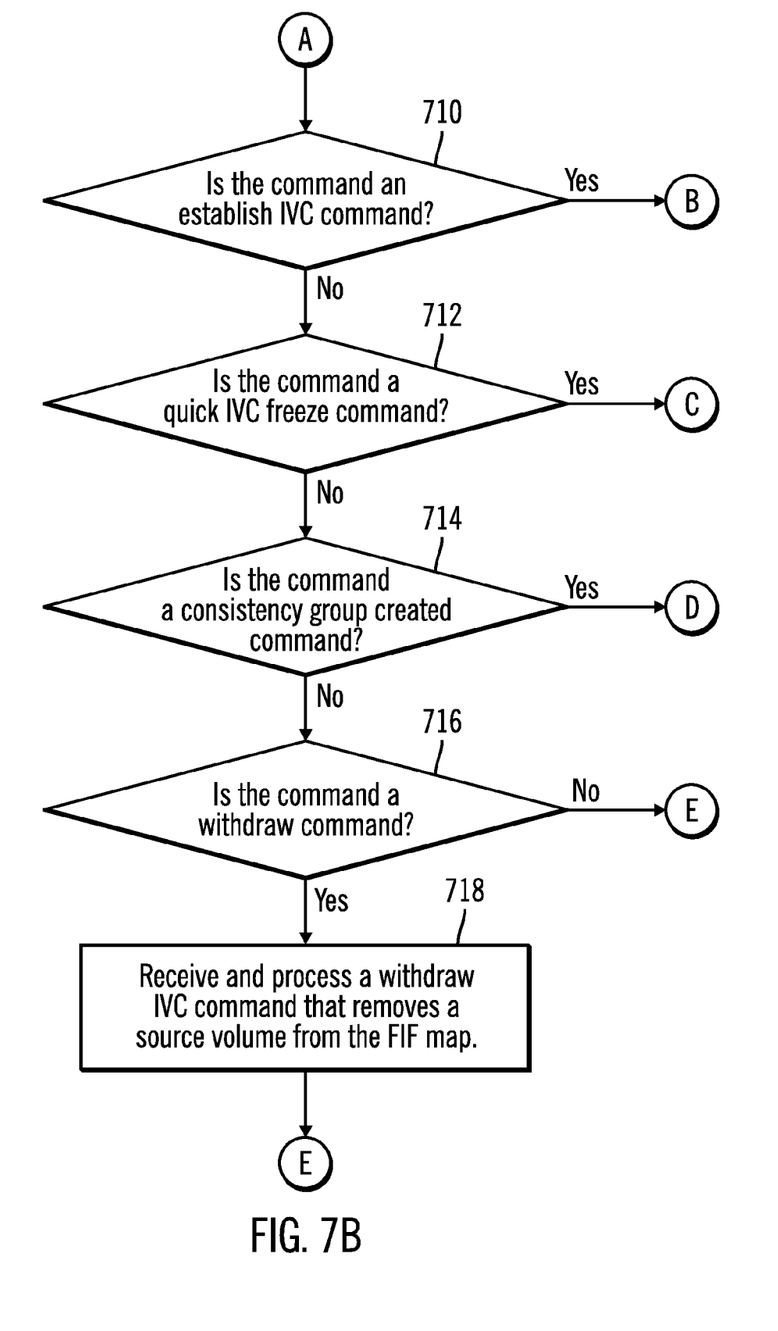

FIG. 7 illustrates, in a flow diagram, operations in accordance with certain embodiments. FIG. 7 is formed by FIGS. 7A and 7B. In FIG. 7, various commands are issued, and these commands may be issued by, for example, a host 114 via a Graphical User Interface (GUI) or Command Line Interface (CLI). In certain embodiments, granularity is on a logical subsystem basis, however, various embodiments may use different granularities.

Control begins at block 700 with the IVC process 126 receiving and processing an establish IVC command that has an FIF indicator set to indicate that this is for FIF processing from a host and that adds a source volume to the FIF map. The establish IVC command uses a new FIF indicator and a persistent IVC relationship indicator. The establish IVC command with these indicators is processed to create persistent IVC relationships. In particular, with the establish IVC command, a persistent relationship is created between the specified source volume and target volume, and the indicator for the source volume is set to true in the FIF map. Thus, the establish IVC command is used to add a source volume to the FIF map. With multiple such establish IVC commands, multiple source volumes may be added to the FIF map.

In certain embodiments, multiple establish IVC commands are received to have multiple pairs of source and target volumes in a FIF map. That is, the establish IVC command is issued for each source/target volume pair that is to have a persistent relationship and for which each source volume is added into the FIF map (for the logical subsystem, session ID, or other granularity).

In block 702, the IVC process 126 receives and processes a quick IVC freeze command from the host to create a consistency group for source volumes whose indicator is set to true in the FIF map 500 and their associated target volumes and to perform a freeze. In certain embodiments, when it is time to create a consistency group, a user issues the quick IVC freeze command. In certain embodiments, the quick IVC freeze command is issued on a per logical subsystem basis. Source volumes in this logical subsystem that have indicators set to true in the FIF map 500 are the set of source volumes that the IVC process 126 will freeze and then copy with IVC. The quick IVC freeze command sets each source volume whose indicator is set to true in the FIF map 500 to a long busy state to begin the freeze of that source volume. Further details of the processing of the quick IVC freeze command are described with reference to FIG. 8.

In block 704, the IVC process 126 receives and processes a consistency group created command from the host for source volumes whose indicator is set to true in the FIF map to perform a thaw. The consistency group created command completes the quick IVC freeze command by freeing the source volumes in the long busy state. In particular, the source volumes are removed from the long busy state. That is, the quick IVC freeze command performs a freeze and then a copy ("flash") of the source volumes in the associated FIF map. Then, the consistency group created command performs a thaw that allows the source volumes frozen to now accept I/O again by removing their long busy state and no longer quiescing their I/O. In certain embodiments, the consistency group create command applies to all the source volumes in the logical subsystem or having the same session ID when the FIF parameter of the establish IVC command is set to one.

In block 706, the IVC process 126 determines whether another command has been received from the host. If so, processing continues to block 710 (FIG. 7B), otherwise, processing continues to block 708. In block 708, the IVC process 126 sleeps until another command is received. Once a new command is received, processing continues to block 706, and the type of command is analyzed.

In certain embodiments, processing is in blocks 706 and 708 for a source volume while the source volume is in the FIF map (i.e., between the establish IVC command and the withdraw IVC command processing). In this sleep state, any of the following commands may be received: the establish IVC command, the withdraw command, the quick IVC freeze command ("freeze" command), or the consistency group created command ("thaw" command). In certain embodiments, it is possible to have many of each of these commands, although a single establish IVC/withdraw command pair is used per source volume to control what is in the FIF map. Also, in certain embodiments, the freeze/thaw command pair may occur on a greater granularity than source volume (e.g., for an entire LS). Thus, the freeze/thaw command pair acts on all the volumes in the FIF for the LSS.

In block 710, the IVC process 126 determines whether the command is an establish IVC command that has an FIF indicator set to indicate that this is for FIF processing from a host. If so, processing continues to block 700 (FIG. 7A), otherwise, processing continues to block 712. In block 712, the IVC process 126 determines whether the command is a quick IVC freeze command. If so, processing continues to block 702 (FIG. 7A), otherwise, processing continues to block 714. In block 714, the IVC process 126 determines whether the command is a withdraw command. If so, processing continues to block 716, otherwise, processing continues to block 706 (FIG. 7A). In block 716, the IVC process 126 processes the withdraw IVC command from the host that removes the source volume from the FIF map.

In certain embodiments, the establish IVC and withdraw IVC commands may be issued at any time, and a consistency group is formed via the quick IVC command for whatever source volumes are identified in the FIF map at the time that the quick IVC command is issued. In certain embodiments, source volumes may be added to the FIF map (by issuing an establish IVC command per source volume) or removed from the FIF map (by issuing a withdraw command per source volume) at any time other than during the freeze/thaw processing of blocks 702 and 704 during which the FIF map is being used to create a consistency group.

In certain embodiments, the order of operations of FIG. 7 may be asynchronous (e.g., it is possible to have a number of quick freezes (via the quick IVC freeze command) and thaws (via the consistency group created command) over a period of time before the withdraw IVC command is received and processed).

In certain embodiments, the operations of FIG. 7 may be terminated using the withdraw command. In certain embodiments, any of the commands processed in FIG. 7 may be issued from a host 114 via a Graphical User Interface (GUI) or Command Line Interface (CLI).

Figure 8:
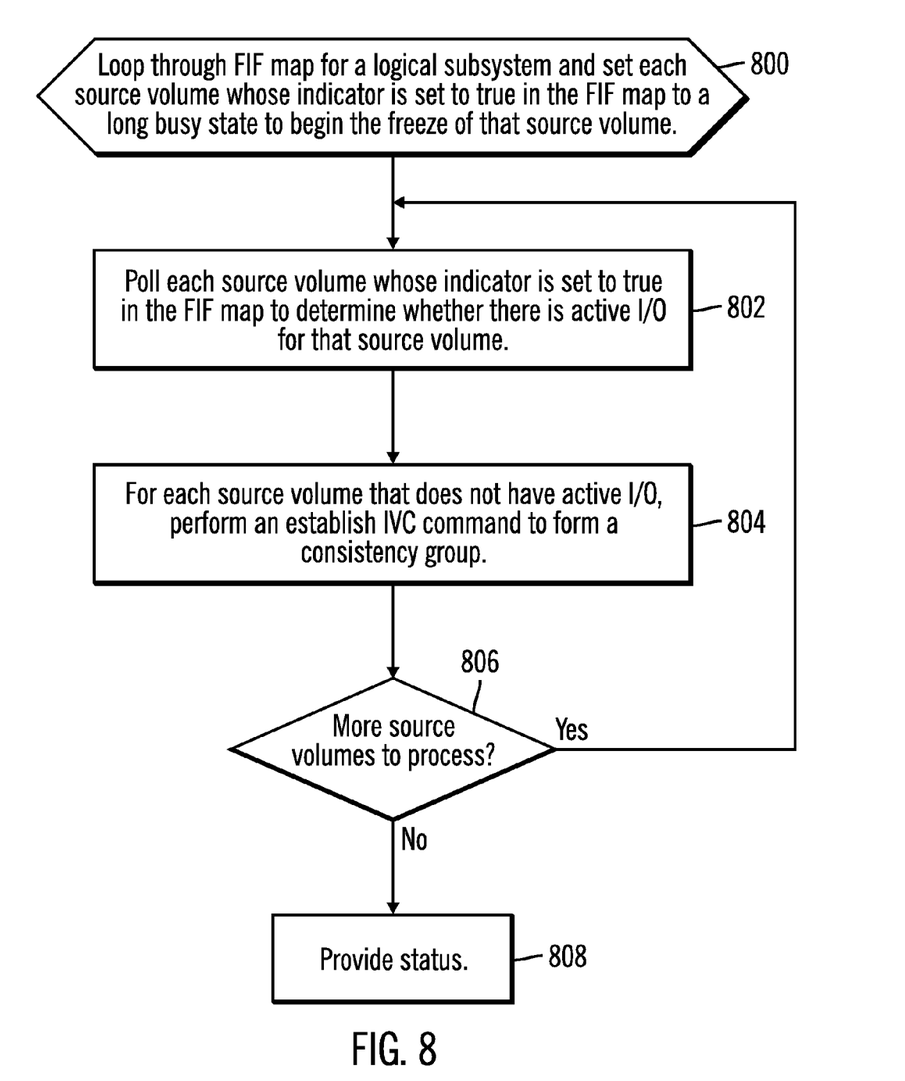
FIG. 8 illustrates process of the quick IVC freeze command in accordance with certain embodiments.
Figure 9:
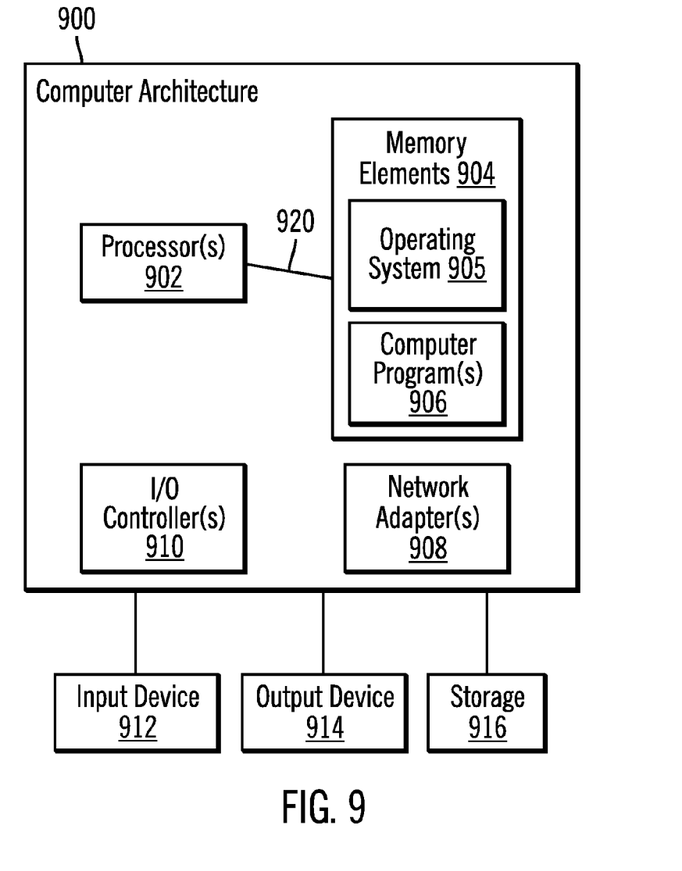
FIG. 9 illustrates, in a block diagram, a computer architecture that may be used in accordance with certain embodiments.

FIG. 8 illustrates process of the quick IVC freeze command in accordance with certain embodiments. Control begins at block 800 with the IVC process looping through the FIF map 500 for the logical subsystem and sets each source volume whose indicator is set to true in the FIF map 500 to a long busy state to begin the freeze of that source volume. In block 802, the IVC process 126 polls each source volume whose indicator is set to true in the FIF map 500 to determine whether there is active I/O for that source volume. In certain embodiments, no I/O is allowed once the source volume is in the long busy state, but there may be I/O to drain that was active prior to the source volume being in the long busy state.

In block 804, the IVC process 126, for each source volume that does not have active I/O, performs the establish IVC command for that source volume with the FIF indicator set to indicate that this source volume is in the set of volumes for FIF processing. Each of the source volumes for which the establish IVC command was issued are put into one consistency group. In block 806, the IVC process 126 determines whether there are more source volumes to process (i.e., source volumes that previously had active I/O, and now no longer have active I/O can now be processed in block 804). If so, processing continues to block 802, otherwise, processing continues to block 808. In block 808, the IVC process 126 provides a status (e.g., a good ending status).

Thus, embodiments expand the quick IVC freeze command to a logical subsystem boundary. In other embodiments, the quick IVC freeze command may be expanded to a Central Electronics Complex (CEC), node, box boundary, etc. In addition, the FIF parameter may be used with a new session ID specification so that the FIF map is by session ID for a source volume in any granularly desired.

Certain embodiments facilitate creation of a multi-volume consistency group at a logical subsystem granularity. Embodiments performing a quick IVC freeze command at the logical subsystem granularity to form the multi-volume consistency group by utilizing a FIF map to identify source volumes within the logical subsystem that are to be part of the consistency group, where the freeze command is issued only when any pre-existing I/O is drained from a source volume.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

FIG. 4 illustrates a computer architecture 400 that may be used in accordance with certain embodiments. The control unit 100 and/or host computers 114 may implement computer architecture 400. The computer architecture 400 is suitable for storing and/or executing program code and includes at least one processor 402 coupled directly or indirectly to memory elements 404 through a system bus 420. The memory elements 404 may include local memory employed during actual execution of the program code, bulk storage, and cache memories which provide temporary storage of at least some program code in order to reduce the number of times code must be retrieved from bulk storage during execution. The memory elements 404 include an operating system 405 and one or more computer programs 406.

Input/Output (I/O) devices 412, 414 (including but not limited to keyboards, displays, pointing devices, etc.) may be coupled to the system either directly or through intervening I/O controllers 410.

Network adapters 408 may also be coupled to the system to enable the data processing system to become coupled to other data processing systems or remote printers or storage devices through intervening private or public networks. Modems, cable modem and Ethernet cards are just a few of the currently available types of network adapters 408.

The computer architecture 400 may be coupled to storage 416 (e.g., any type of storage device; a non-volatile storage area, such as magnetic disk drives, optical disk drives, a tape drive, etc.). The storage 416 may comprise an internal storage device or an attached or network accessible storage. Computer programs 406 in storage 416 may be loaded into the memory elements 404 and executed by a processor 402 in a manner known in the art.

The computer architecture 400 may include fewer components than illustrated, additional components not illustrated herein, or some combination of the components illustrated and additional components. The computer architecture 400 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for creating a consistency group, comprising:
   with a processor of a computer, for each source volume that has an instant virtual copy relationship with a target volume, setting an indicator for the source volume to true in a fast incremental with freeze map; and
   creating the consistency group for each source volume whose indicator is set to true in the fast incremental with freeze map and each associated target volume by:
      performing a quick instant virtual copy freeze command to freeze each source volume whose indicator is set to true in the fast incremental with freeze map; and
      performing a consistency group created command to thaw each source volume whose indicator is set to true in the fast incremental with freeze map.

2. The method of claim 1, wherein the fast incremental with freeze map comprises an indicator for each source volume in a logical subsystem.

3. The method of claim 1, wherein performing the quick instant virtual copy freeze command further comprises:
   setting each source volume whose indicator is set to true in the fast incremental with freeze map to a long busy state.

4. The method of claim 1, wherein performing the quick instant virtual copy freeze command further comprises:
   for each source volume whose indicator is set to true in the fast incremental with freeze map, determining whether that source volume has active Input/Output (I/O); and
   for each source volume whose indicator is set to true in the fast incremental with freeze map that does not have active I/O, performing an establish instant virtual copy command to freeze that source volume and an associated target volume.

5. The method of claim 1, wherein the quick instant virtual copy freeze command acts on multiple source and target volumes to form the consistency group.

6. The method of claim 1, further comprising:
   processing a withdraw command to remove a source volume from the fast incremental with freeze map.

7. The method of claim 1, further comprising:
   processing an establish instant virtual copy command to add a source volume to the fast incremental with freeze map.

8. A computer program product for creating a consistency group, the computer program product comprising:
   a non-transitory computer readable storage medium having computer readable program code embodied therein, wherein the computer readable program code, when executed by at least one processor of a computer, is configured to perform:
   for each source volume that has an instant virtual copy relationship with a target volume, setting an indicator for the source volume to true in a fast incremental with freeze map; and
   creating the consistency group for each source volume whose indicator is set to true in the fast incremental with freeze map and each associated target volume by:
      performing a quick instant virtual copy freeze command to freeze each source volume whose indicator is set to true in the fast incremental with freeze map; and
      performing a consistency group created command to thaw each source volume whose indicator is set to true in the fast incremental with freeze map.

9. The computer program product of claim 8, wherein the fast incremental with freeze map comprises an indicator for each source volume in a logical subsystem.

10. The computer program product of claim 8, wherein, when performing the quick instant virtual copy freeze command, the computer readable program code, when executed by the at least one processor of the computer, is configured to perform:
    setting each source volume whose indicator is set to true in the fast incremental with freeze map to a long busy state.

11. The computer program product of claim 8, wherein, when performing the quick instant virtual copy freeze command, the computer readable program code, when executed by the at least one processor of the computer, is configured to perform:
    for each source volume whose indicator is set to true in the fast incremental with freeze map, determining whether that source volume has active Input/Output (I/O); and
    for each source volume whose indicator is set to true in the fast incremental with freeze map that does not have active I/O, performing an establish instant virtual copy command to freeze that source volume and an associated target volume.

12. The computer program product of claim 8, wherein the quick instant virtual copy freeze command acts on multiple source and target volumes to form the consistency group.

13. The computer program product of claim 8, wherein the computer readable program code, when executed by the at least one processor of the computer, is configured to perform:
    processing a withdraw command to remove a source volume from the fast incremental with freeze map.

14. The computer program product of claim 8, wherein the computer readable program code, when executed by the at least one processor of the computer, is configured to perform:
    processing an establish instant virtual copy command to add a source volume to the fast incremental with freeze map.

15. A computer system for creating a consistency group, comprising:
    at least one processor; and a storage device coupled to the at least one processor, wherein the storage device has stored thereon a program, and wherein the at least one processor is configured to execute instructions of the program to perform operations, wherein the operations comprise:

for each source volume that has an instant virtual copy relationship with a target volume, setting an indicator for the source volume to true in a fast incremental with freeze map; and creating the consistency group for each source volume whose indicator is set to true in the fast incremental with freeze map and each associated target volume by:
   performing a quick instant virtual copy freeze command to freeze each source volume whose indicator is set to true in the fast incremental with freeze map; and
   performing a consistency group created command to thaw each source volume whose indicator is set to true in the fast incremental with freeze map.

16. The computer system of claim 15, wherein the fast incremental with freeze map comprises an indicator for each source volume in a logical subsystem.

17. The computer system of claim 15, wherein, when performing the quick instant virtual copy freeze command, the operations further comprise:
   setting each source volume whose indicator is set to true in the fast incremental with freeze map to a long busy state.

18. The computer system of claim 15, wherein, when performing the quick instant virtual copy freeze command, the operations further comprise:
   for each source volume whose indicator is set to true in the fast incremental with freeze map, determining whether that source volume has active Input/Output (I/O); and
   for each source volume whose indicator is set to true in the fast incremental with freeze map that does not have active I/O, performing an establish instant virtual copy command to freeze that source volume and an associated target volume.

19. The computer system of claim 15, wherein the quick instant virtual copy freeze command acts on multiple source and target volumes to form the consistency group.

20. The computer system of claim 15, wherein the operations further comprise:
   processing a withdraw command to remove a source volume from the fast incremental with freeze map.

21. The computer system of claim 15, wherein the operations further comprise:
   processing an establish instant virtual copy command to add a source volume to the fast incremental with freeze map.

* * * * *